United States Patent [19]

Coleman et al.

[11] 4,168,520

[45] Sep. 18, 1979

[54] MONOLITHIC CERAMIC CAPACITOR WITH FREE-FLOWED PROTECTIVE COATING AND METHOD FOR MAKING SAME

[75] Inventors: James H. Coleman, Wichita Falls; Reginald L. Hofmaier, Burkburnett, both of Tex.

[73] Assignee: Sprague Electric Company, Inc., North Adams, Mass.

[21] Appl. No.: 867,657

[22] Filed: Jan. 6, 1978

[51] Int. Cl.² .............................................. H01G 1/14
[52] U.S. Cl. .................................. 361/308; 29/25.42; 361/306; 361/321; 427/79
[58] Field of Search ............... 361/306, 308, 321, 404, 361/405; 174/50.52; 29/25.42; 427/79

[56] References Cited

U.S. PATENT DOCUMENTS

| | | | |
|---|---|---|---|
| 3,081,374 | 3/1961 | Burch | 174/50.52 X |
| 3,238,490 | 1/1966 | Thomson | 338/273 |
| 3,331,912 | 7/1967 | Stricker | 174/50.52 |
| 3,710,210 | 1/1973 | Heron | 361/321 X |
| 3,890,546 | 6/1974 | Coleman | 361/306 |

FOREIGN PATENT DOCUMENTS

2337325  2/1975  Fed. Rep. of Germany .......... 361/308

OTHER PUBLICATIONS

Sprague, "Eng. Bulletin", 3545A, Jan. 8, 1974.

*Primary Examiner*—E. A. Goldberg
*Attorney, Agent, or Firm*—Connolly and Hutz

[57] ABSTRACT

A monolithic ceramic capacitor has two lead wires each of which is doubly up-set to form two closely adjacent enlarged portions near one end thereof. The end-most enlarged portion of each wire is butt attached by solder to one of the two metallized terminations on the ceramic body. A conformal free-flowed protective resin coating covers the body and just a portion of the adjacent enlarged portion of each lead wire. The adjacent enlarged portion of each lead wire is spaced from ¾ to 3 times the lead wire diameter from the end-most enlarged portion. This adjacent portion serves to stop wicking of the resin outwardly on the lead wire during its application in liquid form and serves as a mounting stand-off in radially leaded capacitor structures.

11 Claims, 8 Drawing Figures

MONOLITHIC CERAMIC CAPACITOR WITH FREE-FLOWED PROTECTIVE COATING AND METHOD FOR MAKING SAME

BACKGROUND OF THE INVENTION

This invention relates to a monolithic ceramic capacitor with lead wires extending therefrom and more particularly to such a capacitor having a solid free-flowed protective coating about the body.

A capacitor of this class having lead wires that are mutually parallel is disclosed in the patent to Coleman, U.S. Pat. No. 3,890,546 issued June 17, 1975. Another capacitor of this class is disclosed in the patent to J. Heron, U.S. Pat. No. 3,710,210 issued Jan. 9, 1973 wherein the leads extend in opposite directions away from the capacitor body. Both of these patents are assigned to the same assignee as is the instant invention.

The lead wires in the above-noted patents each have an enlarged nail-head portion at one end thereof. These leads are each attached by a solder layer between a metal termination region on the body and the end surface of the nail-head. An insulative coating may be applied over the body in liquid form and over the nail-head portions to enhance their strength of attachment.

Although the application of a conformal free-flowed coating in liquid form is substantially less costly than the more disciplined steps of molding or casting, the latter are often chosen for the following reasons.

Conformal free-flowed coatings are typically applied by dipping in liquid resin, shielding and spraying, immersing in a fluidized bed of resin particles or brushing. It is difficult to precisely control the application to a predetermined point along the lead wires. Even when the application is painstakingly controlled, the liquid coating tends to wick further out along the lead wires. These problems are particularly noticeable in tiny monolithic ceramic capacitors for printed wire board mounting wherein the lead wires are relatively large compared with the capacitor body that must be coated, since a unit variation in any dimension of the coated portion of the capacitor tends to be a larger percentage of a smaller component, and the lead diameter not being reduced proportionally provides nearly the same expanse of wicking surface as for the larger component.

It is therefore an object of the present invention to provide a low cost free-flow coated monolithic ceramic capacitor having lead wires butt-attached thereto.

It is a further object of this invention to provide such a capacitor capable of being manufactured with relatively uniform physical dimensions.

It is yet a further object of this invention to provide such a capacitor capable of being manufactured without the aforementioned liquid coating wicking problems.

SUMMARY OF THE INVENTION

A monolithic ceramic capacitor has a ceramic body with buried electrodes and metal film terminations contacting two sets of the alternately interdigitated electrodes, respectively. Two lead wires, each having an enlarged head at one end, are butt attached by their heads to the two termination films, respectively, providing an electrical and mechanical connection to the body.

The lead wires of this invention further have another enlarged portion that is adjacent to but spaced from the enlarged end portion or head portion.

The capacitor has a solid insulative free-flowed coating entirely encompassing the body and extending over at least the end portion of each lead wire to further strengthen its connection to the body.

The coating, having been applied to the body-lead-wire assembly in a free-flowing liquid state, is stopped from wicking up the lead wires substantially beyond its region of application thereto, by the adjacent enlarged portions of the lead wires. The free-flowed coating having been so stopped, forms a meniscus at each of the aforesaid adjacent enlarged portions and extends over less than the whole of these enlarged portions. It is greatly preferred that these adjacent enlarged portions have at least one angular convex corner extending 360° about the axis of the corresponding lead wire to most positively stop wicking, although any enlarged portion will have a convex surface region that will inhibit the wicking. Any interruptions in this corner greatly reduce the "barrier-threshold" to the unwanted wicking.

The double enlarged lead wires of the capacitor of this invention are readily made by a standard cold-forming up-set process in high speed automatic wire forming machines. However, the spacing between the end and the adjacent enlarged portions of a lead wire should be no less than about ¾ of wire diameter apart to make the use of this low cost up-setting method practical. This minimum spacing still insures a broad tolerance of dipping, spraying or otherwise applying a free flowing coating to the body-lead-wire assembly in the region of a lead wire having a diameter as small as 0.015 inch (0.038 cm). Such small lead wires are about the smallest that are prevalent or practical for printed wire board mounting. On the other hand, the space between the end and the adjacent enlarged portions is preferably no greater than about 3 times the diameter of the non-enlarged portions of the lead wire to keep the overall dimensions of the coated body to a minimum, and conserve space in the electrical equipment in which the capacitor will be mounted.

These multiple objectives are readily achieved in capacitors of this invention which may be manufactured on a batch or continuous sequential basis employing non-critical low cost wire-joining and free-flow coating steps that are inherently self-registering and self controlled.

For example, when thinner free-flowed insulative coatings are desired, it is necessary to apply a less viscous liquid resin, which tends to wick much more readily onto the extending leads. Thin coats are often desirable to minimize overall size of the completed capacitor and/or to permit applying more than one thin coat so that pinholes in the first are covered by the next coating. The effective wicking stop provided by the second enlarged lead wire portions may also serve as the mounting stand-offs in a radial leaded ceramic capacitor. The free-flow coated capacitors of this invention may thus be manufactured with unusually uniform geometry from part to part. Among other benefits, this uniformity in geometry provides a uniformly high lead mounting strength.

DESCRIPTION OF THE PREFERRED EMBODIMENTS

Figure 1:
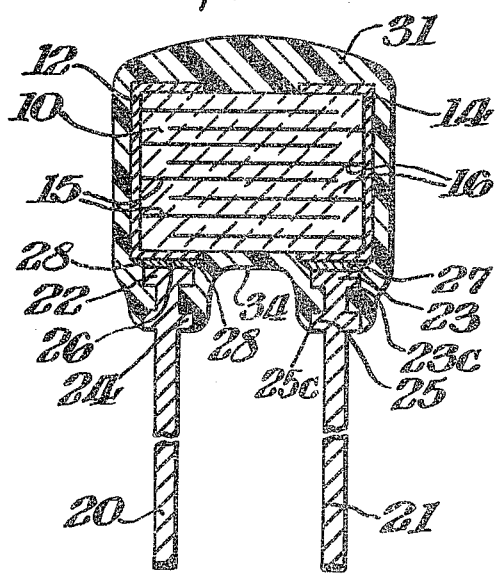
FIG. 1 shows in side sectional view, and essentially to scale, a radial leaded monolithic ceramic capacitor of this invention.
Figure 2:
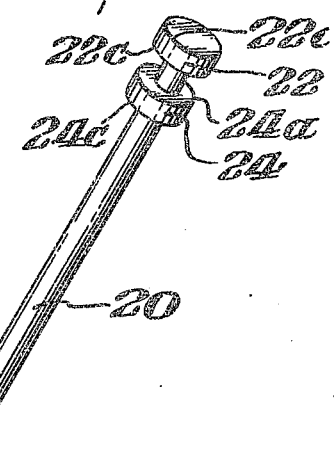
FIG. 2 shows in perspective view a double-nail-head lead wire of this invention.

In a first preferred embodiment of this invention, a monolithic ceramic chip body 10, as shown in FIG. 1, has two metal films 12 and 14 on opposite body faces, each film extending over a portion of the four commonly adjacent body faces. These films are conventionally made by dipping, brushing or otherwise applying an ink or paste comprising a glass frit, silver particles and an organic binder to the end regions of the capacitor chip body and firing the coated body to burn out the organic material and sinter the glass and silver, forming a continuously conducting termination at each end.

Internal to the ceramic body 10 are sheets of conducting material, the alternate sheet electrodes 15 of which extend to one end face making contact to the termination film 12, and the remaining interdigitated sheet electrodes 16 extend to the opposite body face making contact with the other termination film 14. The methods of fabricating such monolithic capacitor bodies are well known in the art.

Two copper lead wires 20 and 21 have enlarged nail head portions 22 and 23, respectively, and adjacent enlarged portions 24 and 25, respectively. It is preferred that the copper leads be solder coated or tin plated (not shown). The nail head portions 22 and 23 are butt-attached to the films 12 and 14, respectively, by means of solder layers 26 and 27. These butt joints are formed by applying a predetermined quantity of a conventional solder paste to the top surfaces of the nail head portions, holding the leads spaced and placing the body 10 into registered abuttment with the nail head portions 22 and 23 of the leads 20 and 21, respectively, as shown in the assembly illustrated in FIG. 1. This placing/registering step is accomplished with the aid of suitable holding jigs. The leads are then pressed against the body by means of a light spring to slightly compress the solder paste therebetween. This assembly is heated to melt the solder which is restrained from flowing further by the surface tensions at the peripheries of the molten solder layers. Alternatively, this surface tension in combination with the relative geometries of the nail head surface and the mating portion of the termination film may automatically register the body with the leads without the use of holding jigs for holding the body.

After allowing this assembly to cool, each solder layer (e.g. 26) has a periphery in the form of a meniscus (e.g. 28) where the surface tension of the molten solder has limited the flow of the solder. The meniscus may be outwardly concave as shown, or by employing a greater pressure between the leads and the body during the solder heating step it may become outwardly convex.

Figures 3, 4, 5, 6, 7:
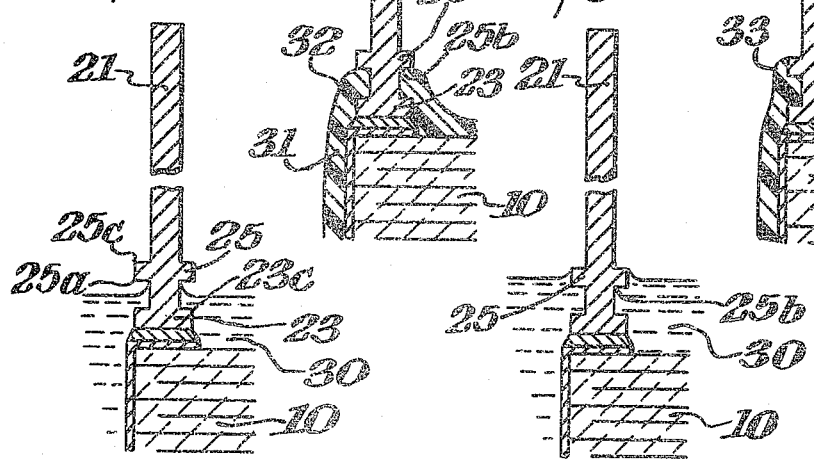
FIG. 3 shows a detail in side sectional view of the capacitor body and lead wire assembly of FIG. 1 being dip coated in a liquid resin.
FIG. 4 shows a detail in side sectional view of the capacitor having been coated by dipping as shown in FIG. 3.
FIG. 5 shows a detail in side sectional view of the capacitor body and lead wire assembly of FIG. 1 being dip coated to a greater depth than in FIG. 3.
FIG. 6 shows a detail in side sectional view of the capacitor having been coated by dipping as shown in FIG. 5.
FIG. 7 shows a detail in side sectional view of the capacitor body and lead wire assembly of FIG. 1 being dip coated to a greater depth yet than in FIG. 5.

The assembly is then turned upside-down and being held by the lead wires is dipped into a pool or bath of liquid resin 30 as is variously illustrated in FIGS. 3, 5 and 7. The particular liquid employed is a phenol formaldehyde based resin having a viscosity of about 4500 centipoise. However, a wide variety of liquid resins may be used including epoxies, thermoplastics, and silicone resins. The surface level of the liquid in FIG. 3 is about in the region of the lead wires between the enlarged portions (e.g. 23 and 25). The liquid resin is inhibited from wicking up the lead wires beyond the enlarged portions 24 and 25 by having to cover a larger area and having to proceed across the outer corners (24a, 24c, 25a and 25c) of enlarged portions 24 and 25. After withdrawal of the assembly from the liquid resin 30 the liquid resin coating is cured by heating to produce the solid resin coating 31 shown in FIG. 4. The coating has a meniscus 32 at the near corner 25a at which the wicking of the liquid resin was stopped. For such a corner to be maximally effective in stopping the wicking it is necessary that there be no discontinuities in it and that it extend continuously 360° about the lead wire 21. Inner or concave corners such as 25b are not effective in stopping wicking.

The assembly may be dipped so that the liquid level corresponds to a plane slightly outwardly of the far corner (23c) of the nail-head portion (23) or up to the far corner (25c) of the adjacent enlarged portion (25) and anywhere inbetween, and still result in the resin coating covering all of the nail-head 23 and a part but not the whole of the adjacent enlarged portion 24. Another such intermediate dipping level and resulting coating are illustrated in FIGS. 5 and 6, the liquid level being about central to enlarged portion 25 at dipping. In this case the resulting coating 31 has a meniscus 33 formed at the far corner 25c, as seen in FIG. 6.

It is even possible to dip the assembly to a greater depth, whereby the far corners (e.g. 25c) of the adjacent enlarged portions 24 and 25 are below the surface of the liquid resin as illustrated in FIG. 7. Upon withdrawal of the assembly and curing, the coating 31 will have substantially the same features as illustrated in FIG. 6.

The doubly enlarged lead wire of this invention is especially useful when the ceramic capacitor to which it is attached is a very small one. For example, the capacitor of FIG. 1, represents an experimental unit wherein the monolithic ceramic body is 0.16 inch wide, 0.15 inch high and 0.07 inch thick (not seen), or 0.41×0.38×0.18 centimeters, respectively. The diameters of the enlarged portions (e.g. 23 and 25) are each 0.045 inch (0.11 cm), and the diameter of the main stem of the lead wire is 0.025 inch (0.63 cm). The spacing between the enlarged portions 23 and 25, measured from corner 25c to corner 25a is 0.035 inch (0.089 cm). The thickness of the portions 23 and 25 taken in the axial direction of the lead wire is relatively uncritical and is 0.012 inch (0.030 cm) in this example. The depth of dipping the capacitors of this example in a liquid resin (e.g. 30) must be controlled within a tolerance of 0.047 inch, a broad tolerance requiring only simple jigging and a minimum of care to avoid producing waves in the surface of the liquid, and consequently permitting a relatively high speed of entry of the body into the resin in the dipping step.

It is also notable that after dipping to any of the broad range of levels (between corner 23c to corner 25c) the resulting contact area of the free-flowed coating 31 always extends out the lead at least as far as the adjacent enlarged portion 25. This result depends upon a controlled amount of positive wicking out the lead in the case of using shallow dipping levels. Accordingly, the lead mounting strength tends to be uniformly high.

The conformal coating 31 is also seen in FIG. 1 to form a generous cavity 34 in the region between the enlarged portions of the two lead wires 20 and 21. The coating thickness in a direction away from the body is greater at the coating menisci by substantially more than a factor of two than the coating thickness in a central region between the two leads. When the capacitor is subsequently solder mounted by the lead wires in holes of a printed wire board, this cavity 34 advantageously permits free access of solder-flux cleaning agents in this region.

Moreover, the doubly enlarged lead wire of this invention is well suited for applying a liquid resin coating to either a radial leaded or to an axially leaded capacitor body by a standard fluidized bed process.

Figure 8:
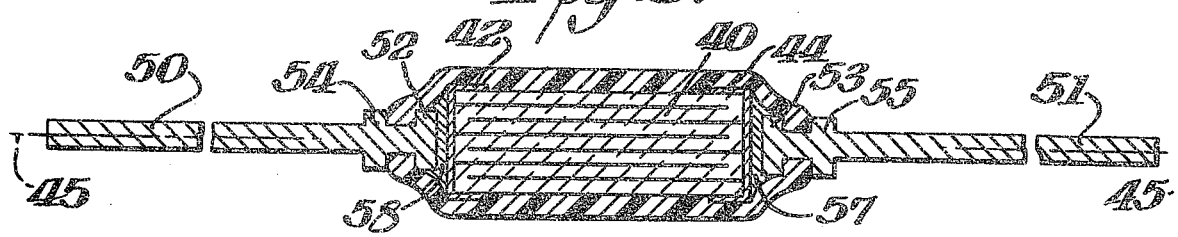
FIG. 8 shows in side sectional view an axial leaded monolithic ceramic capacitor of this invention.

Such an axial leaded capacitor is shown in FIG. 8 having a body 40, termination films 42 and 44, and a pair of alternately interdigitated sheet electrodes. Two double enlarged lead-wires 50 and 51 are butt-attached to the films 42 and 44, respectively, by means of intermediate solder layers 58 and 57. The adjacent enlarged lead portions 54 and 55 have the preferred shape of a coin that is concentric with the axis 45 of lead wires 50 and 51, respectively. This assembly is then preheated to around 150° C., gently rotated about the axis 45, and immersed into the kinetically activated bed of partially cured epoxy resin particles. The particles reaching the preheated body become molten and a hot liquid free-flowing coating of the resin is quickly formed over the body and cured thereabout. The width of the bed (not shown) may be slightly larger than the length (left to right as shown in FIG. 8) of the body 40 so as to prevent initial wetting of the lead wires 50 and 51 beyond the adjacent enlarged portions 54 and 55, respectively. The adjacent enlarged portions 54 and 55 stop the liquid resin from further wicking out along the leads.

What is claimed is:

1. A monolithic ceramic capacitor comprising:
   a ceramic body;
   a first and second metal film covering one and another spaced regions of the surface of said body;
   a plurality of spaced sheet electrodes being buried within said body, the alternate of said electrodes extending to one of said metal films and the remainder of said electrodes extending to the other of said metal films.
   a first and second lead wire, each having an enlarged nail-head portion at one end thereof and an adjacent enlarged portion which is spaced from said nail-head portion a distance ranging from ¾ to 3 times the diameter of the non-enlarged portions of said each wire, each of said adjacent enlarged portions having at least one angular convex corner extending continuously 360° about the corresponding axis of said lead wires, said nail-head portions of said first and second lead wires being butt-attached to said first and second metal films, respectively, by means of two solid conductive layers, respectively; and
   a cured solid insulative resin coating encompassing said body and said nail-head portions, and extending over a part of but less than the whole of said adjacent enlarged portions, said coating having been applied in a free flowing liquid state forming a meniscus at each of said adjacent enlarged portions.

2. The capacitor of claim 1 wherein said lead wires extend away from said body in a mutually parallel direction.

3. The capacitor of claim 2 wherein the thickness of said coating in a direction away from said body is greater at said coating menisci by a factor of more than two over said thickness in a central region between said lead wires.

4. The capacitor of claim 1 wherein said leads extend coaxially in opposite directions from said body.

5. The capacitor of claim 1 wherein said adjacent enlarged portion has at least a second angular convex corner extending continuously 360° about the corresponding axis of said lead wires.

6. The capacitor of claim 1 wherein said adjacent enlarged portion has the shape of a circular coin that is concentric with the axis of the corresponding of said lead wires.

7. The capacitor of claim 1 wherein said solid conductive layers each have a peripheral portion thereof in the shape of a meniscus.

8. A method for making a monolithic ceramic capacitor comprising forming a ceramic body having a first and second metal film covering one and another spaced region of the surface of said body and having buried in said body a plurality of spaced sheet electrodes, the alternate of said electrodes extending to one of said metal films and the remainder of said electrodes extending to the other of said metal films; attaching in abuttment an enlarged nail-head end portion of a first and of a second lead wire to said first and second metal films, respectively, by means of two solid conductive layers, respectively, each of said lead wires having an adjacent enlarged portion which is spaced from said nail-head portion a distance ranging from ¾ to 3 times the diameter of the non-enlarged portions of said each wire, each of said adjacent enlarged portions having at least one angular convex corner extending continuously 360° about the corresponding axis of said lead wires; applying a free-flowing liquid resin coating completely over said body and extending over said nail-head portions and over less than the whole of said adjacent enlarged portions; and curing said resin coating.

9. The method of claim 8 wherein said attaching includes positioning said leads to be mutually parallel and extending away from said body in the same direction, said applying being accomplished by holding said leads and dipping said body into a bath of said liquid resin; and withdrawing said body from said bath.

10. The method of claim 9 wherein the level of said bath during said dipping lies between the outermost part of said nail-head portion and the outermost part of said adjacent enlarged portion of each of said leads.

11. The method of claim 8 wherein said applying is accomplished by preheating said body and selectively exposing said body to a fluidized bed of partially cured resin particles.

* * * * *